United States Patent
White et al.

(10) Patent No.: US 9,130,835 B1
(45) Date of Patent: Sep. 8, 2015

(54) METHODS AND APPARATUS FOR CONFIGURATION BINDING IN A DISTRIBUTED SWITCH

(75) Inventors: Joseph White, San Jose, CA (US);
Gunes Aybay, Los Altos, CA (US);
Predrag Spasic, Rocklin, CA (US);
Murali Vemula, Fremont, CA (US);
Ravi Shekhar, Sunnyvale, CA (US);
Quaizar Vohra, Santa Clara, CA (US);
Jainendra Kumar, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 357 days.

(21) Appl. No.: 12/957,990

(22) Filed: Dec. 1, 2010

(51) Int. Cl.
*H04L 12/28* (2006.01)
*H04L 12/24* (2006.01)

(52) U.S. Cl.
CPC ........ *H04L 41/0806* (2013.01); *H04L 41/0809* (2013.01)

(58) Field of Classification Search
USPC .................................. 370/400–430, 254–258
IPC .................. H04L 29/12216, 29/12839, 41/0806, H04L 43/0817, 61/2007, 61/6022, 43/045
See application file for complete search history.

(56) References Cited

U.S. PATENT DOCUMENTS

| | | | | |
|---|---|---|---|---|
| 5,751,971 | A * | 5/1998 | Dobbins et al. | 709/238 |
| 6,137,797 | A * | 10/2000 | Bass et al. | 370/392 |
| 2003/0012182 | A1* | 1/2003 | Sato | 370/352 |
| 2003/0227917 | A1* | 12/2003 | Maher et al. | 370/392 |
| 2005/0264420 | A1* | 12/2005 | Vogel et al. | 340/572.1 |
| 2007/0117444 | A1* | 5/2007 | Caveney et al. | 439/404 |
| 2007/0147362 | A1* | 6/2007 | Beshai et al. | 370/388 |
| 2008/0056161 | A1 | 3/2008 | Okita et al. | |
| 2008/0263185 | A1* | 10/2008 | Anderson et al. | 709/220 |
| 2010/0165877 | A1* | 7/2010 | Shukla et al. | 370/254 |
| 2010/0180322 | A1 | 7/2010 | Finn et al. | |

* cited by examiner

*Primary Examiner* — Khaled Kassim
*Assistant Examiner* — Zhaohui Yang
(74) *Attorney, Agent, or Firm* — Cooley LLP

(57) ABSTRACT

An apparatus includes a network management module to store a network configuration file. The network configuration file having a binding association with an identifier of a port from a plurality of ports of a switch fabric when the network management module is in a first configuration. The network management module selects the network configuration file based on the binding association with the identifier if the port in response to an access switch being operatively coupled to the port. The network configuration file having a binding association with an identifier of the access switch when the network management module is in a second configuration. The network management module selects the network configuration file based on the binding association with the identifier of the access switch in response to the access switch being operatively coupled to the port.

20 Claims, 9 Drawing Sheets

| Configuration Table 555 | | |
|---|---|---|
| Configuration File 515 | Access Switch ID 525 | Configuration Binding 540 |
| $CF_1$ | $AS_1$ | $CF_1 - AS_1$ |
| $CF_2$ | $AS_2$ | $CF_2 - AS_2$ |
| $CF_3$ | $AS_3$ | $CF_3 - AS_3$ |
| $CF_4$ | $AS_4$ | $CF_4 - AS_4$ |
| ⋮ | ⋮ | ⋮ |
| $CF_N$ | $AS_M$ | $CF_N - AS_M$ |

| Configuration Table 655 (First Time Period) ||||
| Configuration File 615 | Access Switch ID 625 | Port ID 630 | Configuration Binding 640 |
|---|---|---|---|
| CF₁ | AS₁ | P₁ | CF-P |
| CF₂ | AS₂ | P₄ | CF-AS |
| CF₃ | AS₃ | P₁₁ | CF-P |
| CF₄ | AS₄ | P₈ | AS-P |
| CF₅ | AS₅ | P₂₃ | AS-P |
| CF₆ | AS₆ | P₁₈ | CF-AS |
| ⋮ | ⋮ | ⋮ | ⋮ |
| CF_N | AS_M | P_T | CF-P |

| Configuration Table 655 (Second Time Period) ||||
| Configuration File 615 | Access Switch ID 625 | Port ID 630 | Configuration Binding 640 |
| --- | --- | --- | --- |
| $CF_1$ | $AS_1$ | $P_1$ | CF-P |
| $CF_2$ | $AS_2$ | $P_4$ | CF-P |
| $CF_3$ | $AS_3$ | $P_{11}$ | CF-P |
| $CF_4$ | $AS_4$ | $P_8$ | AS-P |
| $CF_5$ | $AS_5$ | $P_{23}$ | AS-P |
| $CF_6$ | $AS_6$ | $P_{18}$ | CF-AS |
| ⋮ | ⋮ | ⋮ | ⋮ |
| $CF_N$ | $AS_M$ | $P_T$ | CF-P |

| Configuration Table 655 (Third Time Period) ||||
|---|---|---|---|
| Configuration File 615 | Access Switch ID 625 | Port ID 630 | Configuration Binding 640 |
| $CF_1$ | $AS_1$ | $P_1$ | CF-P |
| $CF_2$ | $AS_8$ | $P_4$ | CF-AS |
| $CF_3$ | $AS_3$ | $P_{11}$ | CF-P |
| $CF_4$ | $AS_4$ | $P_8$ | AS-P |
| $CF_5$ | $AS_5$ | $P_{23}$ | AS-P |
| $CF_6$ | $AS_6$ | $P_{18}$ | CF-AS |
| ⋮ | ⋮ | ⋮ | ⋮ |
| $CF_N$ | $AS_M$ | $P_T$ | CF-P |

METHODS AND APPARATUS FOR CONFIGURATION BINDING IN A DISTRIBUTED SWITCH

BACKGROUND

Some embodiments described herein relate generally to switch fabric systems, and, in particular, to methods and apparatus for configuration binding in a distributed switch within a switch fabric system.

Some known distributed switches within a switch fabric system can associate a module identifier (e.g., a serial number) to a named block to specify configuration information that belongs to which module. Such a method does not allow, however, for physical replacement of components without a corresponding change in configuration information by an administrator. For example, replacement of an edge device (e.g., an access switch) within a switch fabric can involve changing the configuration information to associate the identity of the new edge device (i.e., replacement edge device) with the configuration information of the edge device that is being replaced. Although such an approach can be appropriate in some deployments of the distributed switch, it may be desirable in other deployments to provide additional modes of operation and configuration associations.

Accordingly, a need exists for the ability to provide configuration binding associations within a distributed switch fabric system to allow for physical replacement and/or movement of components of the distributed switch fabric system without a change in configuration information associated with that component.

SUMMARY

An apparatus includes a network management module to store a network configuration file. The network configuration file having a binding association with an identifier of a port from a set of ports of a switch fabric when the network management module is in a first configuration. The network management module selects the network configuration file based on the binding association with the identifier of the port in response to an access switch being operatively coupled to the port. The network configuration file having a binding association with an identifier of the access switch when the network management module is in a second configuration. The network management module selects the network configuration file based on the binding association with the identifier of the access switch in response to the access switch being operatively coupled to the port.

DETAILED DESCRIPTION

Figure 1:
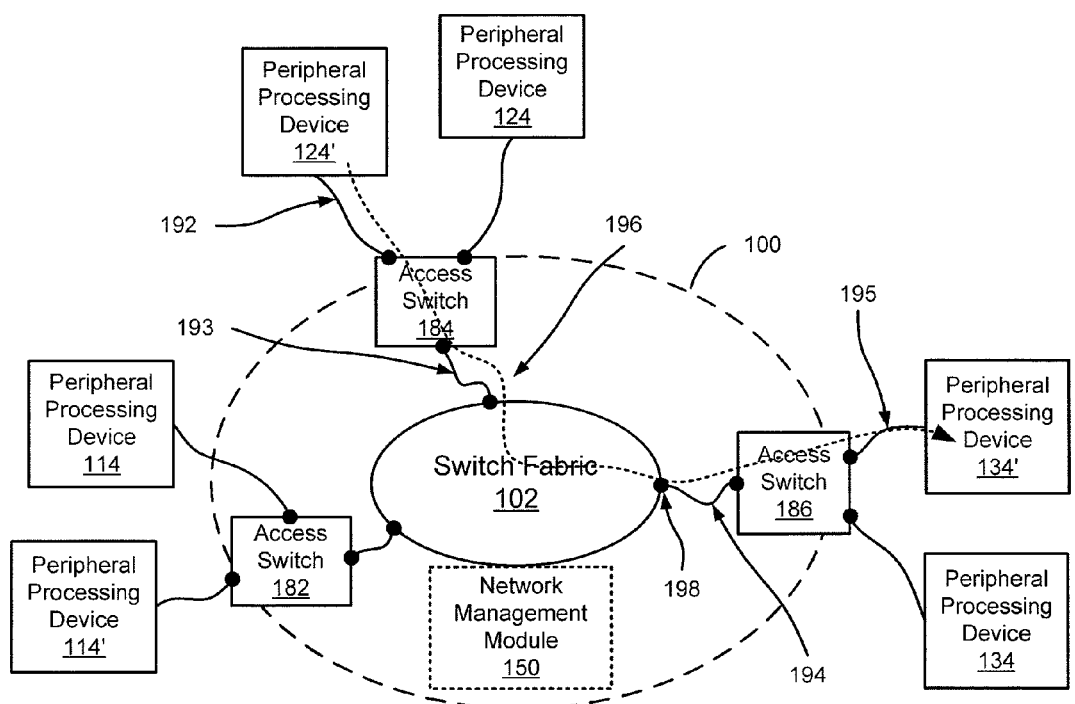
FIG. 1 is a system block diagram of a switch fabric system, according to an embodiment.

Systems, apparatus and methods are described herein to provide configuration binding in a switch fabric system. For example, a module as described herein can provide physical replacement of components within a switch fabric system, without a corresponding change in the configuration information by an administrator. A physical replacement method similar to replacing blades in a chassis-based switch or router may be desirable in some operational deployments of a switch fabric system. Such a physical replacement method can supplement a logical configuration binding by allowing both physical attachment error detection and transparent replacement of components of the switch fabric system. In addition, physical binding of configuration information can be used to validate the physical connection attachments on the components within the switch fabric system. Such a validation can check the initial configuration if the physical attachment information is entered into the named configuration block. Such a validation can also check configuration changes against the physical system (e.g., physical components and physical attachments between components) to ensure conformance between the configuration changes and the physical system.

The configuration information can be included within a network configuration file. The configuration information can, for example, relate to a portion of the switch fabric system or to the entire switch fabric system. Thus, in some embodiments, configuration binding can be provided for a portion of the switch fabric system or to the entire switch fabric system. Accordingly, it should be understood that references herein to a network configuration file can refer to configuration information for a portion of a switch fabric system or to configuration information for the entire switch fabric system. For example, references to storing or binding a network configuration file can relate to storing or binding configuration information for a portion of the switch fabric system or to the entire switch fabric system.

In some embodiments, an apparatus includes a network management module to store a network configuration file. The network configuration file having a binding association with an identifier of a port from a plurality of ports of a switch fabric when the network management module is in a first configuration. The network management module selects the network configuration file based on the binding association with the identifier if the port in response to an access switch being operatively coupled to the port. The network configuration file having a binding association with an identifier of the access switch when the network management module is in a second configuration. The network management module selects the network configuration file based on the binding association with the identifier of the access switch in response to the access switch being operatively coupled to the port.

In some embodiments, a non-transitory processor-readable medium storing code representing instructions to cause a processor to select, during a first time period, a network configuration file in response to a first access switch being coupled to the port of the switch fabric and a network management module being in a first configuration in which the network configuration file has a binding association with an identifier of the first access switch. After the first time period but before a second time period, the network management module can be switched from the first configuration to a second configuration. The network configuration file has a binding association with an identifier of the port of the switch fabric and not the identifier of the first access switch when the network management module is in the second configuration. During the second time period, the network configuration file can be selected in response to the second access switch being coupled to the port of the switch fabric and the network management module being in the second configuration.

In some embodiments, a system includes multiple access switches. Each access switch from the multiple access switches configured to be operatively coupled to a port from multiple ports of a switch fabric. Each access switch from the multiple switches has an identifier. The identifier of each access switch from the multiple access switches has a binding association with a network configuration file from a set of network configuration files when the multiple access switches are in a first configuration such that each access switch from the multiple access switches is associated with one network configuration file from the set of network configuration files independent of which port from the multiple ports each access switch from the multiple access switches is to be operatively coupled. Each access switch from the multiple access switches is to be assigned a network configuration file from the set of network configuration files when the multiple access switches are in a second configuration and based on the port from the multiple ports to which each access switch is to be operatively coupled.

As described herein, a network management module can have different states or stored values that can be referred to as multiple different configurations. A network management module can have an associated configuration table with multiple rows that each can be associated with its own configuration. In other words, although the network management module is often described herein as being in a particular configuration, it should be understood that each row of the associated table can be in a particular configuration that is the same as or different from the configuration for the remaining rows. For example, the network management module can have a first configuration in which the network management module defines a binding association of a configuration file with an identifier of a port of a switch fabric. The network management module can have a second configuration in which the network management module defines a binding association of a configuration file with an identifier of an access switch coupled to a port of switch fabric. In some embodiments, the network management module can have a third configuration in which the network management module defines a binding association between an identifier of an access switch and an identifier of a port of the switch fabric.

The terms "first configuration", "second configuration", "third configuration" and so are used herein to refer to configurations of a network management module that define different binding associations of components within a switch fabric system. In some instances, these terms refer to a specific configuration of the network management module. For example, as described above, in a first configuration, the network management module can define a binding association between a configuration file and a port or port identifier of a fabric switch. In other instances, however, the terms refer to different configurations in the order referenced or discussed. Thus, in certain contexts, the terms "first configuration", "second configuration" and so on can refer to any of the configuration of the network management module. Similarly, an access switch can have various configurations that can also be referred to, for example, as "first configuration", "second configuration", "third configuration" and so on. For example, an access switch can be coupled to a first port of a switch fabric when in a first configuration and that same access switch can be coupled to a second port of the access switch and not the first port when in a second configuration. Thus, it should be understood that the specific context will indicate whether the terms "first configuration", "second configuration" and so on can refer to a specific configuration or can refer to any particular configuration.

A switch fabric system, or a portion of a switch fabric system can have multiple different arrangements. As described herein, an arrangement can refer to the particular positioning and operative couplings of access switches to ports of a switch fabric. For example, a first access switch can be coupled to a first port of a switch fabric and a second access switch can be coupled to a second port of the switch fabric to define a first arrangement of the switch fabric system. The first access switch can be coupled to a third port of the switch fabric and the second access switch can be coupled to the second port of the switch fabric to define a second arrangement of the switch fabric system. Various combinations of operative couplings between access switches and ports of a switch fabric can be defined.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol. Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol can use the destination address of the first protocol to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated L2/L3 switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, a physical hop can operatively couple each stage within a switch fabric representing a single logical hop associated with a protocol used to route data outside the switch fabric. Additionally, packet classification and forwarding associated with a protocol used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used herein, a module that is within a switch fabric can be, for example, any assembly and/or set of operatively-coupled electrical components that define one or more switches within a stage of a switch fabric. In some embodiments, a module can include, for example, a memory, a processor, electrical traces, optical connectors, and/or the like.

As used herein, "associated with" can mean, for example, included in, physically located with, a part of and/or operates or functions as a part of. For example, a module associated with a first stage of a switch fabric can be said to be included in, physically located with or a part of the first stage of the switch fabric. A module associated with a first stage of a switch fabric can also be said to operate or function as a part of the first stage of the switch fabric. Additionally, "associated with" can mean, for example, references, identifies, characterizes, describes, and/or sent from. For example, an identifier associated with a virtual channel can be an identifier that identifies, references and/or relates to the virtual channel.

As used in this specification, the singular forms "a," "an" and "the" include plural referents unless the context clearly dictates otherwise. Thus, for example, the term "a switch fabric" is intended to mean a single switch fabric or a combination of switch fabrics.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the third stage (the third and final stage with respect to the ingress to egress direction). For example, FIG. 2 refers to specific stages within a given switch fabric. In other instances, however, the terms "first stage", "second stage" and so on refer to any stage within the switch fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic diagram that illustrates a switch fabric system 100, according to an embodiment. The switch fabric system 100 includes a switch fabric 102 and multiple access switches 182, 184, 186. The switch fabric system 100 also includes a network management module 150. The switch fabric system 100 operatively couples multiple peripheral processing devices 114, 124, 134 to each other. The peripheral processing devices 114, 124, 134 can be, for example, compute nodes, service nodes, routers, and storage nodes, as described in further detail herein. In some embodiments, for example, the peripheral processing devices 114, 124, 134 include servers, storage devices, gateways, workstations, and/or the like.

The peripheral processing devices 114, 124, 134 can be operatively coupled to the access switches 182, 184, 186 of the switch fabric system 100 using any suitable connection such as, for example, an optical connection (e.g., an optical cable and optical connectors), an electrical connection (e.g., an electrical cable and electrical connectors) and/or the like. As such, the peripheral processing devices 114, 124, 134 are configured to send data (e.g., data packets, data cells, etc.) to the switch fabric system 100 via the access switches 182, 184, 186. In some embodiments, the connection between the peripheral processing devices 114, 124, 134 and the access switches 182, 184, 186 is a direct link. Such a link can be said to be a single physical hop link. In other embodiments, the peripheral processing devices 114, 124, 134 can be operatively coupled to the access switches via intermediate modules. Such a connection can be said to be a multiple physical hop link.

Each access switch 182, 184, 186 can be any device configured to operatively couple peripheral processing devices 114, 124, 134 to the switch fabric 102. In some embodiments, for example, the access switches 182, 184, 186 can be edge devices, input/output modules, top-of-rack devices and/or the like. Structurally, the access switches 182, 184, 186 can function as both source access switches and destination access switches. Accordingly, the access switches 182, 184, 186 can send data (e.g., a data stream of data packets and/or data cells) to and receive data from the switch fabric 102, and to and from the connected peripheral processing devices 114, 124, 134.

In some embodiments, the access switches 182, 184, 186 can be a combination of hardware modules and software modules. In some embodiments, for example, each access switch 182, 184, 186 can include a field-programmable gate array (FPGA), an application specific integrated circuit (ASIC), a digital signal processor (DSP) and/or the like.

The access switches 182, 184, 186 can be configured to prepare a data packet (e.g., an Ethernet packet) to enter the switch fabric 102. For example, the access switches 182, 184, 186 can be configured to forward, classify, and/or modify the packet encapsulation (e.g., modify, add and/or remove a header portion, footer portion and/or any other identifier included within the data packet) of a data packet prior to sending the data packet to the switch fabric 102. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Each of the access switches 182, 184, 186 is configured to communicate with the other access switches 182, 184, 186 via the switch fabric 102. Specifically, the switch fabric 102 is configured to provide any-to-any connectivity between the access switches 182, 184, 186 at relatively low latency. For example, switch fabric 102 can be configured to transmit (e.g., convey) data between access switches 182, 184, 186. In some embodiments, the switch fabric 102 can have at least hundreds or thousands of ports (e.g., egress ports and/or ingress ports) through which access switches 182, 184, 186 can transmit and/or receive data.

The access switches 182, 184, 186 can include one or more network interface devices (e.g., a 40 Gigabit (Gb) Ethernet interface, a 100 Gb Ethernet interface, etc.) through which the access switches 182, 184, 186 can send signals to and/or receive signals from the switch fabric 102. The signals can be sent to and/or received from the switch fabric 102 via an electrical link, an optical link and/or a wireless link operatively coupled to the access switches 182, 184, 186. In some embodiments, the access switches 182, 184, 186 can be configured to send signals to and/or receive signals from the switch fabric 102 based on one or more protocols (e.g., an Ethernet protocol, a multi-protocol label switching (MPLS) protocol, a fibre channel protocol, a fibre-channel-over Ethernet protocol, an Infiniband-related protocol).

The switch fabric 102 can be any suitable switch fabric that operatively couples the access switches 182, 184, 186 to the other access switches 182, 184, 186. In some embodiments, for example, the switch fabric 102 can be a Clos network (e.g., a non-blocking Clos network, a strict sense non-blocking Clos network, a Benes network) having multiple stages of switching modules (e.g., integrated Ethernet switches). In some embodiments, for example, the switch fabric 102 can be similar to the three-stage switch fabric 200 shown in FIG. 2 and described in further detail herein. In other embodiments, the switch fabric 102 shown in FIG. 1 can include any number of stages. In such embodiments, for example, the switch fabric 102 can include five, seven or nine stages. The switch fabric 102 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the switch fabric 102 can be (e.g., can function as) a single consolidated switch (e.g., a single large-scale consolidated L2/L3 switch). In other words, the switch fabric 102 can be configured to operate as a single logical entity (e.g., a single logical network element). Similarly stated, the switch fabric 102 can be part of a single logical hop between a first access switch 182, 184, 186 and a second access switch 182, 184, 186 (e.g., along with the data paths between the edge devices 182, 184, 186 and the switch fabric 102). The switch fabric 102 can be configured to connect (e.g., facilitate communication between) the peripheral processing devices 114, 124, 134. In some embodiments, the switch fabric 102 can be configured to communicate via interface devices (not shown) configured to transmit data at a rate of at least 10 Gb/s. In some embodiments, the switch fabric 102 can be configured to communicate via interface devices (e.g., fibre-channel interface devices) configured to transmit data at a rate of, for example, 2 Gb/s, 4, Gb/s, 8 Gb/s, 10 Gb/s, 40 Gb/s, 100 Gb/s and/or faster link speeds.

Although the switch fabric 102 can be logically centralized, the implementation of the switch fabric 102 can be highly distributed, for example, for reliability. For example, portions of the switch fabric 102 can be physically distributed across, for example, many chassis. In some embodiments, for example, a processing stage of the switch fabric 102 can be included in a first chassis and another processing stage of the switch fabric 102 can be included in a second chassis. Both of the processing stages can logically function as part of a single consolidated switch (e.g., within the same logical hop) but have a separate single physical hop between respective pairs of processing stages. More details related to architecture of the switch fabric 102 are described herein.

In use, a data packet (e.g., an Ethernet packet) can be sent between peripheral processing devices 114, 124, 134 via the switch fabric system 100. For example, a data packet can be sent from a first peripheral processing device 124' to a second peripheral processing device 134' via path 196. The first peripheral processing device 124' can send the data packet to the access switch 184 via link 192 using a first protocol (e.g., Ethernet). The access switch 184 can then prepare the data packet to enter the switch fabric 102 (e.g., based on a second protocol). Once prepared, the access switch 184 sends the data packet to the switch fabric 102 via link 193. The switching modules within the switch fabric 102 can route the data packets through the switch fabric 102 according to the second protocol. The data packet is sent through port 198 to the access switch 186 via link 194. The access switch 186 can then send the data packet to the second peripheral processing device 134' via link 195 using the first protocol.

The network management module 150 can be a process, application, virtual machine, and/or some other software module (executing in hardware) or a hardware module. In some embodiments, the network management module 150 can be executed at a compute device (not shown in FIG. 1). An example of a compute device is described below with reference to FIG. 4. In some embodiments, the network management module 150 can store (e.g., in a memory) a configuration file associated with configuration information (e.g., port protocol information, network segment assignment information, port assignment information, peripheral processing device information, etc.) and/or associated with forwarding-state information (e.g., routing information, port identifiers, network segment identifiers, peripheral processing device identifiers, etc.) associated with the switch fabric system 100. For example, the network management module 150 can define a binding association of a configuration file with the access switches 182, 184, 186 (or an identifier of each access switch) and/or define a binding association of a configuration file with various ports (or an identifier of each port from the various ports) coupled to the access switches 182, 184 186. The capability of the network management module 150 to provide a binding association of a configuration file to either a port or an access switch allows for removal, movement and/or replacement of components (e.g., access switches and/or ports) within the switch fabric 102 without having to define a new configuration file for the component being moved, removed, or replaced. The network management module 150 can also define a binding association between an access switch and a port of the switch fabric 102.

The network management module 150 can have different states or stored values that can be referred to as multiple different configurations. For example, in some embodiments, when the network management module 150 defines a binding association of a configuration file with an identifier of a port of switch fabric 102, this can be defined as a first configuration of the network management module 150, and when the network management module 150 defines a binding association of a configuration file with an identifier of an access switch (e.g., access switches 182, 184, 186), this can be defined as a second configuration of the network management module 150. In some embodiments, the network management module 150 can have a third configuration in which the network management module 150 defines a binding association between an identifier of an access switch and an identifier of a port of the switch fabric 102. Various configurations and binding associations within a switch fabric are described in more detail below with reference to specific embodiments.

During operation, when an access switch (182, 184 186) is initially coupled to a port of the switch fabric 102, the network management module 150 can select a configuration file (e.g., a set of policies and rules) to be used during provisioning of that access switch depending on the particular configuration of the network management module 150. For example, as described above, if the network management module 150 is in a first configuration in which it defines a binding association of a configuration file to an identifier of a port, then when an access switch is coupled to that port, the configuration file that has a binding association with that port will be used during provisioning of that access switch and applied to incoming data packets received at that access switch.

In another example, the network management module 150 can be in a second configuration with respect to a configuration file in which it defines a binding association of the configuration file with a first access switch coupled to a first port of the switch fabric 102. If the first access switch is to be decoupled from the port of the switch fabric 102, prior to decoupling the first access switch, the network management module 150 can be switched to a first configuration in which the configuration file is unbound from the first access switch and has a binding association with the first port coupled to the first access switch. The first access switch can be removed and a second access switch can be coupled to the first port of the fabric switch 102. The network management module 150 can provision the second access switch to use the configuration file that is bound to the first port. The network management module 150 can also be switched to the second configuration (i.e., the configuration file has binding association to an access switch) so that the configuration file now has a binding association with the second access switch.

Figure 2:
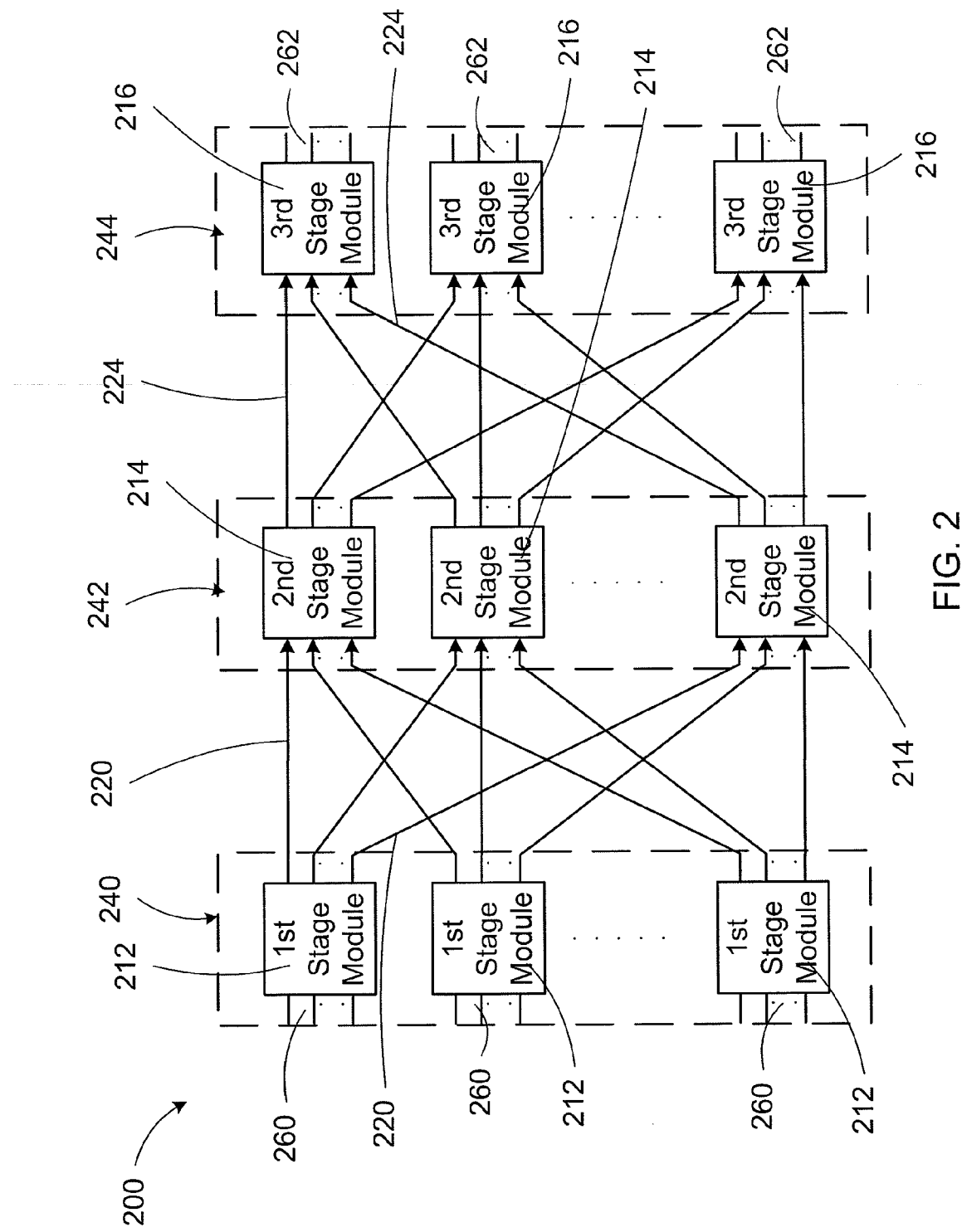
FIG. 2 is a schematic illustration of a switch fabric, according to another embodiment.

FIG. 2 is a schematic illustration of a switch fabric 200, similar to the switch fabric 102 in FIG. 1. The switch fabric 200 can include multiple physical hops that are within a single logical hop. Switch fabric 200 is a three-stage, non-blocking Clos network and includes a first stage 240, a second stage 242, and a third stage 244. The first stage 240 includes modules 212. Each module 212 of the first stage 240 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 212 of the first stage 240 is a switch (e.g., a packet switch, a frame switch, an integrated Ethernet switch and/or a cell switch). The switches are configured to redirect data (e.g., data packets, data cells, etc.) as it flows through the switch fabric 200. In some embodiments, for example, each switch includes multiple input ports operatively coupled to write interfaces on a memory buffer (not shown in FIG. 2). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 212 of the first stage 240 includes a set of input ports 260 configured to receive data (e.g., a signal, a cell of a packet, a data packet, etc.) as it enters the switch fabric 200. In this embodiment, each module 212 of the first stage 240 includes the same number of input ports 260.

Similar to the first stage 240, the second stage 242 of the switch fabric 200 includes modules 214. The modules 214 of the second stage 242 are structurally similar to the modules 212 of the first stage 240. Each module 214 of the second stage 242 is operatively coupled to each module 212 of the first stage 240 by a data path 220. Each data path 220 between a given module 212 of the first stage 240 and a given module 214 of the second stage 242 is configured to facilitate data transfer from the modules 212 of the first stage 240 to the modules 214 of the second stage 242.

The data paths 220 between the modules 212 of the first stage 240 and the modules 214 of the second stage 242 can be constructed in any manner configured to facilitate data transfer from the modules 212 of the first stage 240 to the modules 214 of the second stage 242. In some embodiments, for example, the data paths 220 are optical connectors between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 200 is a non-blocking Clos network. Thus, the number of modules 214 of the second stage 242 of the switch fabric 200 varies based on the number of input ports 260 of each module 212 of the first stage 240. In a rearrangeably non-blocking Clos network (e.g., a Benes network), the number of modules 214 of the second stage 242 is greater than or equal to the number of input ports 260 of each module 212 of the first stage 240. Thus, if n is the number of input ports 260 of each module 212 of the first stage 240 and m is the number of modules 214 of the second stage 242, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 244 of the switch fabric 200 includes modules 216. The modules 216 of the third stage 244 are structurally similar to the modules 212 of the first stage 240. The number of modules 216 of the third stage 244 is typically equivalent to the number of modules 212 of the first stage 240. Each module 216 of the third stage 244 includes output ports 262 configured to allow data to exit the switch fabric 200. Each module 216 of the third stage 244 includes the same number of output ports 262. Further, the number of output ports 262 of each module 216 of the third stage 244 is typically equivalent to the number of input ports 260 of each module 212 of the first stage 240.

Each module 216 of the third stage 244 is connected to each module 214 of the second stage 242 by a data path 224. The data paths 224 between the modules 214 of the second stage 242 and the modules 216 of the third stage 244 are configured to facilitate data transfer from the modules 214 of the second stage 242 to the modules 216 of the third stage 244.

The data paths 224 between the modules 214 of the second stage 242 and the modules 216 of the third stage 244 can be constructed in any manner configured to facilitate data transfer from the modules 214 of the second stage 242 to the modules 216 of the third stage 244. In some embodiments, for example, the data paths 224 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, the data paths 220 between the modules 212 of the first stage 240 and the modules 214 of the second stage 242, and the data paths between the modules 214 of the second stage 242 and the modules 216 of the third stage 244, can include multiple virtual channels.

Figure 3:
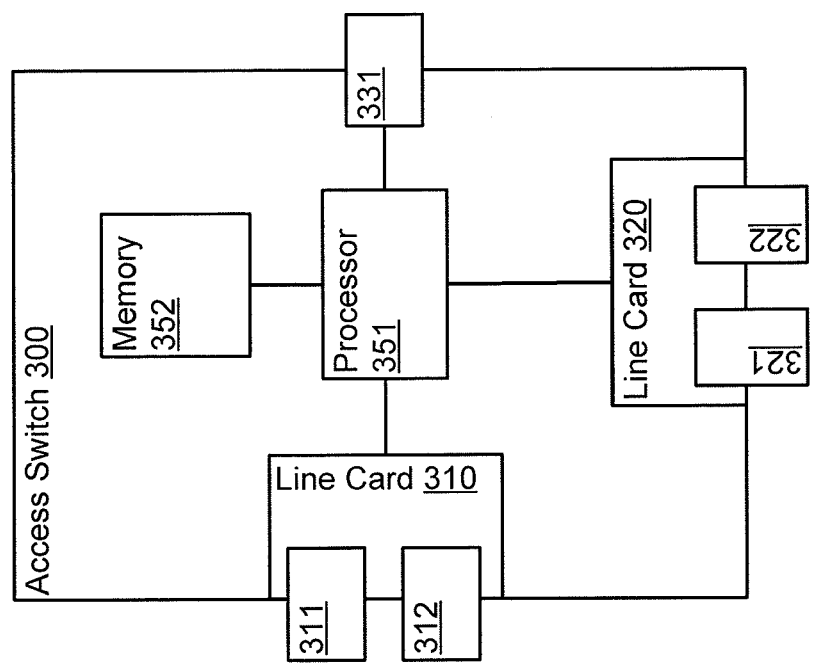
FIG. 3 is a schematic illustration of an access switch of a switch fabric system, according to another embodiment.

FIG. 3 is a system block diagram of an access switch 300 similar to the access switches 182, 184, 186. The access switch 300 includes processor 351, memory 352, line card 310, line card 320, and port 331. Processor 351 is operatively coupled to memory 352, line card 310, line card 320 and port 331. Line card 310 includes ports 311 and 312. Line card 320 includes ports 321 and 322. In some embodiments, line cards 310 and/or 320 include one or more processors and/or memories (not shown).

Ports 311, 312, 321 and 322 can communicate with peripheral processing devices. For example, ports 311, 312, 321 and 322 can implement a physical layer using twisted-pair electrical signaling via electrical cables or fiber-optic signaling via fiber-optic cables. In some embodiments, some of ports 311, 312, 321 and 322 can implement one physical layer such as twisted-pair electrical signaling and others of ports 311, 312, 321 and 322 can implement a different physical layer such as fiber-optic signaling. Furthermore, ports 311, 312, 321 and 322 can allow access switch 300 to communicate with peripheral processing devices, such as, for example, computer servers (servers), via a common protocol such as Ethernet or Fibre Channel. In some embodiments, some of ports 311, 312, 321 and 322 can implement one protocol, such as Ethernet, and others of ports 311, 312, 321 and 322 can implement a different protocol such as Fibre Channel. Thus, access switch 300 can be in communication with multiple peripheral processing devices using homogeneous or heterogeneous physical layers and/or protocols via ports 311, 312, 321 and 322.

Port 331 can be in communication with other access switches via a communications network such as a switch fabric (e.g., switch fabric 102). Port 331 can be part of one or more network interfaces (e.g., a 40 Gigabit (Gb) Ethernet interface, a 100 Gb Ethernet interface, etc.) through which the access switch 300 can send signals to and/or receive signals from a communications network. The signals can be sent to and/or received from the communications network via an electrical link, an optical link and/or a wireless link operatively coupled to the access switch 300. In some embodiments, the access switch 300 can send signals to and/or receive signals from a communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 331 can implement a different physical layer and/or data link layer protocol than those implemented at ports 311, 312, 321 and 322. For example, port 311, 312, 321 and 322 can communicate with peripheral processing devices using a protocol based on data packets (e.g., a packet-based protocol such as Ethernet) and port 331 can communicate via a data plane portion of a communications network (e.g., a switch fabric) using a protocol based on data cells (e.g., a cell-based protocol). In such embodiments and as described in further detail herein, the access switch 300 can receive a data packet from a peripheral processing device (e.g., using a packet-based protocol) via a port 311, 312, 321, 322 and divide and/or partition the data packet into data cells. After the data packet is divided and/or partitioned into data cells, the access switch 300 can send the data cells to a data plane portion of a communications network via port 331. Similarly stated, in such embodiments, access switch 300 can convert and/or modify data from a packet-based protocol to a cell-based protocol prior to sending the data to the communications network. Said differently, access switch 300 can be an access switch of a switch fabric (e.g., switch fabric 102) such as a distributed switch fabric.

In some embodiments, the access switch 300 can prepare a data packet (e.g., an Ethernet frame and/or packet) to enter a data plane portion of a communications network (e.g., switch fabric 102). For example, the access switch 300 can forward, classify, and/or modify the packet encapsulation (e.g., modify, add and/or remove a header portion, footer portion and/or any other identifier included within the data packet) of a data packet prior to sending the data packet to the data plane portion of the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 4:
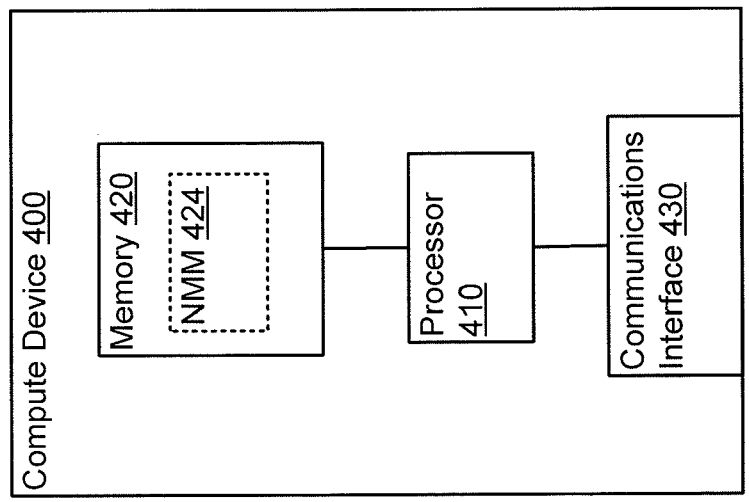
FIG. 4 is a schematic illustration of a compute device of a switch fabric system, according to another embodiment.

FIG. 4 is a system block diagram of a compute device 400. Compute device 400 includes processor 410, memory 420, and communications interface 430. Processor 410 is operatively coupled to memory 420 and communications interface 430. Compute device 400 can communicate with other compute devices, peripheral processing devices and/or access switches via communications interface 430. The compute device 400 can host management modules, processes and/or functions associated with a switch fabric system (e.g., switch fabric system 100).

As illustrated in FIG. 4, compute device 400 can host a network management module 424 similar to the network management module 150, shown in FIG. 1. In other words, network management module 424 can be processes, applications, virtual machines, and/or some other software module (executing in hardware) or hardware module that is executed at compute device 400. In some embodiments, for example, instructions that implement network management module 424 can be stored at memory 420 and executed at processor 410.

In some embodiments, compute device 400 can be dedicated to hosting network management module 424. In other words, compute device 400 can allocate all or substantially all of its computing resources (e.g., processing capacity and memory) to network management module 424. In some embodiments, compute device 400 can host other processes, applications, virtual machines, and/or software modules in addition to network management module 424. For example compute device 400 can be a general purpose compute device or compute node that hosts multiple processes, applications, virtual machines, and/or software modules.

Figures 5, 6:
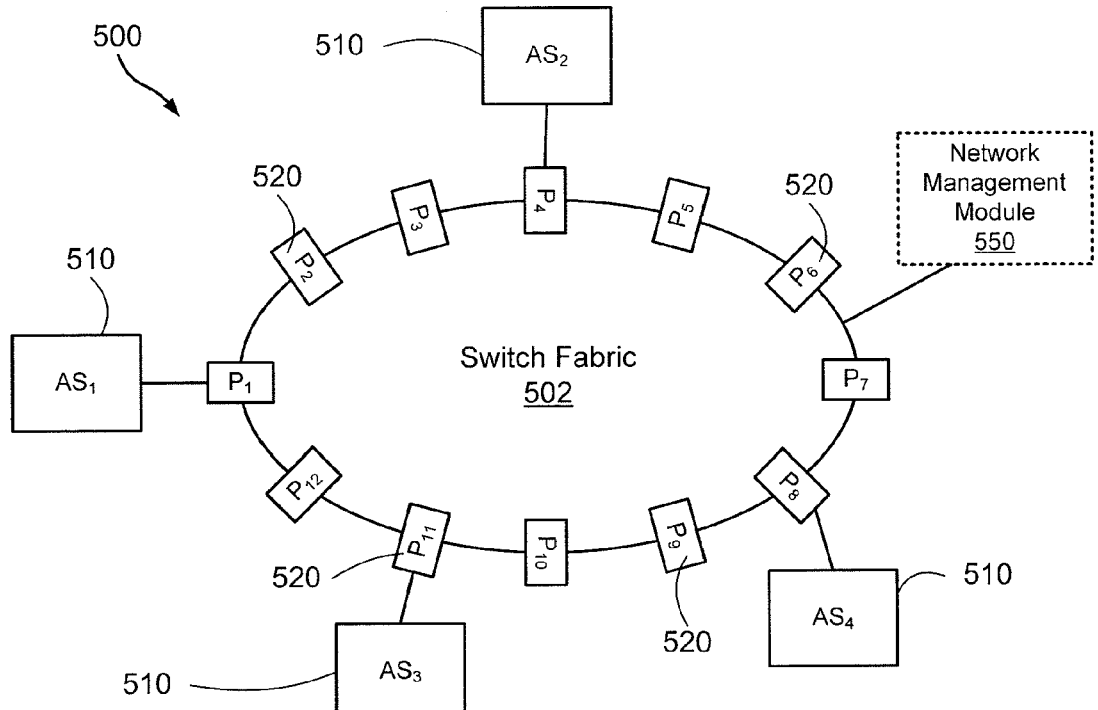
FIG. 5 is a schematic illustration of a portion of a switch fabric system, shown in a first configuration, according to an embodiment.
FIG. 6 is an example configuration table associated with the switch fabric system of FIG. 5, according to an embodiment.

FIG. 5 is a schematic diagram that illustrates a portion of a switch fabric system according to an embodiment. A switch fabric system 500 includes a switch fabric 502 that includes multiple ports 520, some of which are connected to one of multiple access switches 510. The switch fabric 502 is also connected to a network management module 550. Although FIG. 5 illustrates an example of one configuration of the switch fabric system 500 showing only four access switches 510 and twelve ports 520, it should be understood that the fabric switch system 500 can include any number of ports 520 and can be connected to various numbers of access switches 510. The access switches 510 can each function and be configured the same or similar to the access switches 182, 184, 186 and/or access switch 300 described above. The network management module 550 can provide the same functions and be configured the same or similar to the network management module 150 described above. The ports 520 can each provide the same functions and be configured the same or similar to, for example, ports 311, 312, 321 and 322 described above.

As shown in FIG. 6, the network management module 550 can define a configuration table 555 associated with the switch fabric system 500 that includes multiple configuration files 515 ($CF_1$, $CF_2$, ... $CF_N$), access switch IDs (i.e., identifiers) 525 and configuration bindings 540 associated with the access switch identifiers 525 and the configuration files 515. As shown in configuration table 555, in this embodiment, the network management module 550 can define a binding association of each of the configuration files 515 with one of the access switches 510. Thus, in this embodiment, the network management module 550 has a first configuration (i.e., defining a binding association of a configuration file to an access switch).

As shown in FIG. 5, an access switch 510 with identifier $AS_1$ is coupled to a port 520 with a port identifier $P_1$; an access switch 510 with identifier $AS_2$ is coupled to a port 520 with a port identifier $P_4$; an access switch 510 with identifier $AS_3$ is coupled to a port 520 with a port identifier $P_{11}$; an access switch 510 with identifier $AS_4$ is coupled to a port 520 with a port identifier $P_8$.

Figures 7, 8:
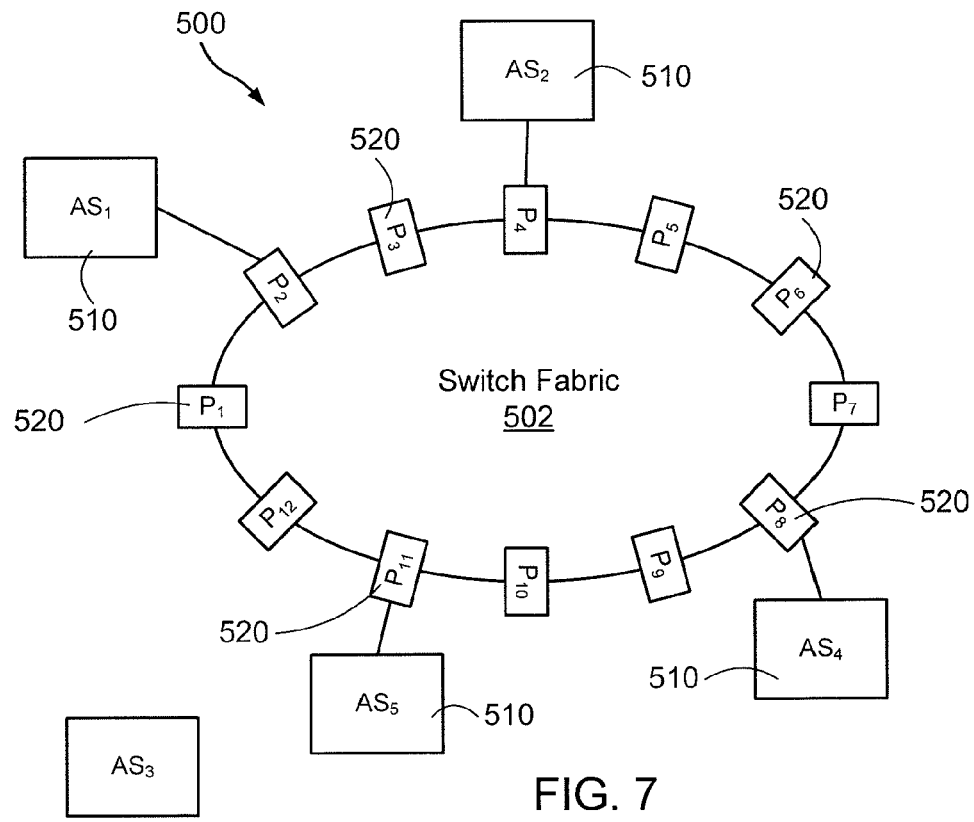
FIG. 7 is a schematic illustration of the portion of the switch fabric system of FIG. 5, shown with in a second configuration.
FIG. 8 is an example configuration table associated with the switch fabric system configuration of FIG. 7.

With this first configuration of the network management module 550, if a particular access switch 510 is removed or moved to another port 520, the associated configuration file will move with (or remain with) that access switch. For example, as shown in FIG. 7, if access switch 510 with identifier $AS_1$ is disconnected from port 520 with port identifier $P_1$, and coupled to port 520 with port identifier $P_2$, the configuration file $CF_1$ will move with (or remain with) the access switch 510. Thus, a binding association exists of each configuration file 515 with each of the particular access switch identifiers 525 (each configuration file 515 is associated with an access switch identifier 525). If a particular access switch 510 is to be replaced, the network management module 550 can define a new configuration file for that new access switch (i.e., access switch identifier 525). For example, as shown in FIG. 7, if access switch 510 with identifier $AS_3$ is to be removed from the switch fabric system 500, a new access switch 510 with identifier $AS_5$ can be coupled to port 520 with port identifier $P_{11}$. In this example, the configuration file $CF_3$ that was previously associated with the access switch identifier $AS_3$ will be unbound from (or disassociated from) the access switch 510 with identifier $AS_3$, and the new access switch 510 with identifier $AS_5$ will have a new or different configuration file $CF_5$ associated with it. In such an instance, the configuration table 555 can be updated, as shown in FIG. 8, such that the configuration binding 540 having the value $CF_3$-$AS_3$ is deleted, and a new binding is stored in the configuration table 555 where configuration binding 540 has a value $CF_5$-$AS_5$.

Figures 9, 10:
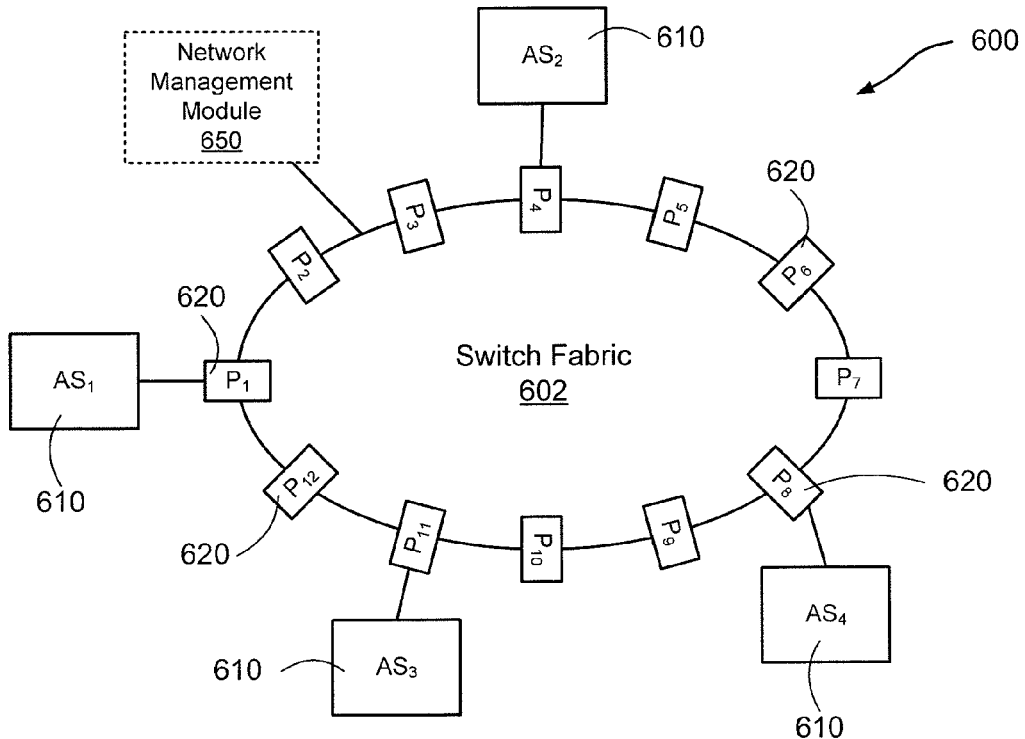
FIG. 9 is a schematic illustration of a portion of a switch fabric system shown in a first configuration, according to an embodiment.
FIG. 10 is an example configuration table associated with the switch fabric system configuration of FIG. 9.

FIG. 9 is another example of a switch fabric system according to an embodiment. A switch fabric system 600 includes a switch fabric 602 that includes multiple ports 620, some of which are connected to one of multiple access switches 610. The switch fabric 602 is also connected to a network management module 650. Although FIG. 9 illustrates an example of one configuration of the switch fabric system 600 showing only four access switches 610 and twelve ports 620, it should be understood that the fabric switch 602 can include any number of ports 620 and can be connected to various numbers of access switches 610. The access switches 610 can each function and be configured the same or similar to the access switches 182, 184, 186 and/or access switch 300 described above. The network management module 650 can provide the same functions and be configured the same or similar to the network management module 150 described above. The ports 620 can each provide the same functions and be configured the same or similar to, for example, ports 311, 312, 321 and 322 described above.

As shown in FIG. 10, in this embodiment, the network management module 650 defines a configuration table 655 associated with the switch fabric 602 that includes multiple configuration files 615 ($CF_1$, $CF_2$, ... $CF_N$), multiple access switch IDs (i.e., identifiers) 625, multiple port IDs (i.e., identifiers) and multiple different configuration bindings 640 associated with configuration files 615, the access switch identifiers 625 and/or the port identifiers 630.

In this embodiment, the network management module 650 can have multiple different configurations. For example, in a first configuration, the network management module 650 can define a binding association of a configuration file 615 with an identifier of a port 610. In a second configuration, the network configuration module 650 can define a binding association of a configuration file 615 with identifier of an access switch 620. In a third configuration, the network management module 650 can define a binding association between identifier of an access switch 610 and an identifier of a port 620. Each of these different configurations is described in more detail below. As shown in configuration table 655, the access switch identifiers 625 and the port identifiers 630 can be used to represent the binding associations 640 between the configuration files 615 and the particular access switches 610 or particular ports 620, or between a particular access switch 610 and a particular port 620.

As shown in FIG. 9, an access switch 610 with identifier $AS_1$ is coupled to a port 620 with a port identifier $P_1$; an access switch 610 with identifier $AS_2$ is coupled to a port 620 with a port identifier $P_4$; an access switch 610 with identifier $AS_3$ is coupled to a port 620 with a port identifier $P_{11}$; an access switch 610 with identifier $AS_4$ is coupled to a port 620 with a port identifier $P_8$.

During operation, the network management module 650 can apply multiple configurations to a particular component of the switch fabric 602 as needed. As shown in configuration table 655 of FIG. 10, at a first time period, the network management module 650 defines different types of binding associations. The network management module 650 can have a first configuration in which the network management module 650 defines a binding association of a configuration file 615 to an identifier of a port 620, as shown, for example, in configuration table 655, for configuration files $CF_1$, $CF_3$ and $CF_N$. The network management module 650 can have a second configuration in which the network management module 650 defines a binding association of a configuration file 615 to an identifier of an access switch 610, as shown, for example, in configuration table 655, for configuration files $CF_2$ and $CF_6$. The network management module 650 can have a third configuration in which the network management module 650 defines a binding association between an identifier of an access switch 610 and an identifier of a port 620, as shown, for example, in configuration table 655, for configuration files $CF_4$ and $CF_5$.

Figures 11, 12:
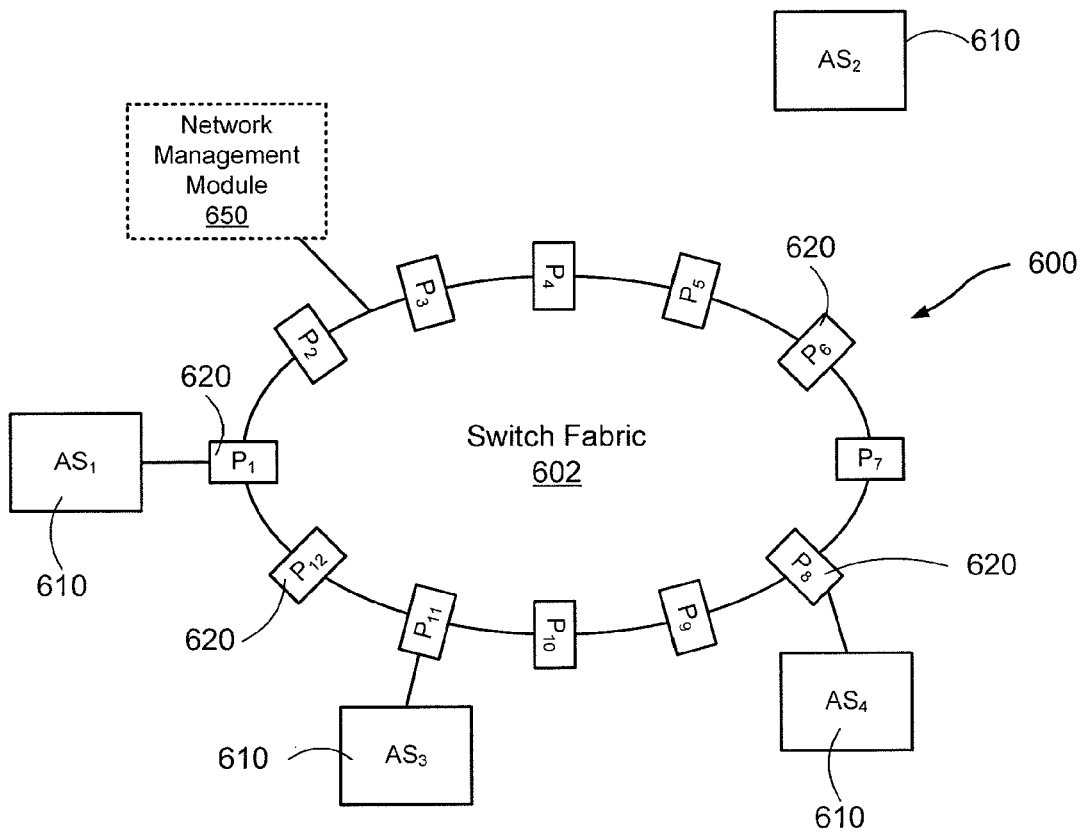
FIG. 11 is a schematic illustration of a portion of the switch fabric system of FIG. 9 shown in a second configuration.
FIG. 12 is an example configuration table associated with the switch fabric system configuration of FIG. 11.

At a second time period, if, for example, a component of the switch fabric system 600 is to be replaced, the network management module 650 can be switched from a first configuration to a second configuration, or vice versa with respect to a particular configuration file 615. For example, as shown in FIG. 10, the network management module 650 is in its second configuration with respect to configuration file $CF_2$ during the first time period, such that configuration file $CF_2$ has a binding association with identifier $AS_2$ of access switch 610. If during a second time period access switch 610 with identifier $AS_2$ is removed from the switch fabric 602 at port 620 with port identifier $P_4$ as shown in FIG. 11, and it is desirable to maintain the binding association of configuration file $CF_2$ with an identifier of a new replacement access switch 610 coupled to port 620 with port identifier $P_4$, the network management module 650 can be switched to its first configuration with respect to configuration file $CF_2$ in which configuration file $CF_2$ now has a binding association with port identifier $P_4$ of port 620, as shown in FIG. 12.

Figures 13, 14:
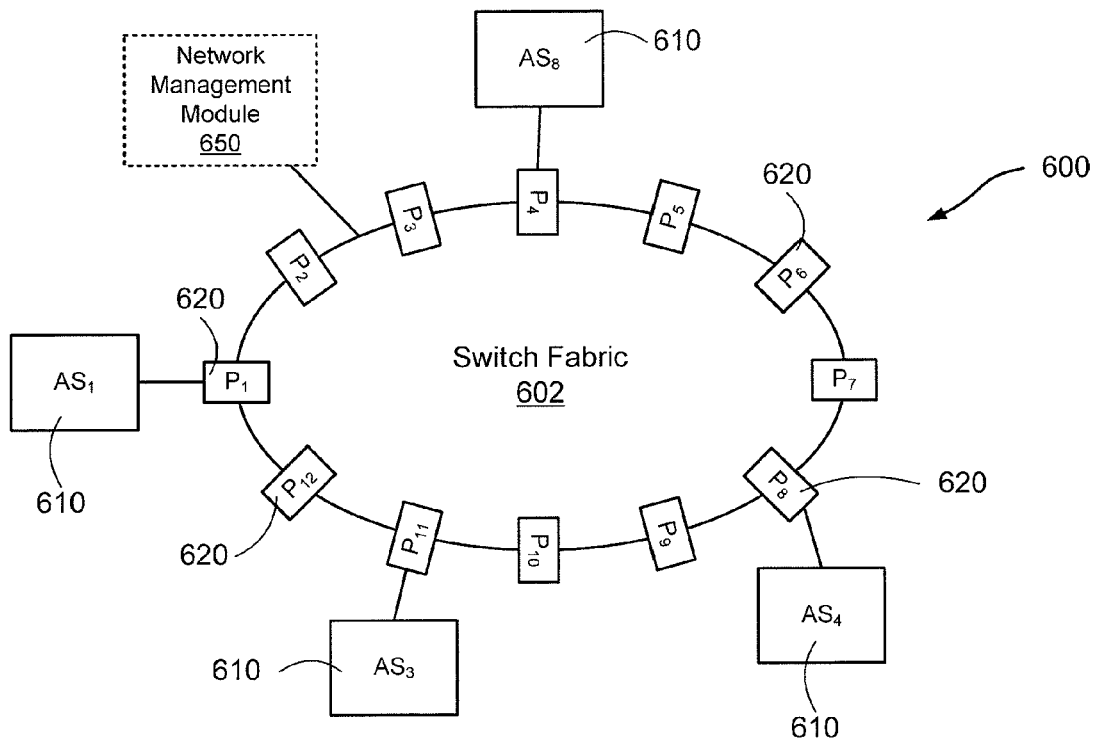
FIG. 13 is a schematic illustration of a portion of the switch fabric system of FIG. 9 shown in a third configuration.
FIG. 14 is an example configuration table associated with the switch fabric system configuration of FIG. 13.

When a replacement access switch 610 is coupled to the port 620 with port identifier $P_4$, the network management module 650 can be switched back to its second configuration with respect to the configuration file $CF_2$ as shown in FIGS. 13 and 14 so that that the identifier of access switch 610 and the configuration file $CF_2$ have a binding association. As shown in FIG. 13, a replacement access switch 610 with identifier $AS_8$ is coupled to the port 620 with port identifier $P_4$. As shown in FIG. 14, the network management module 650 can then be switched to its second configuration (e.g., defining a binding association between the configuration file and an access switch) with respect to configuration file $CF_2$ such that the configuration file $CF_2$ has a binding association with the new replacement access switch 610 with identifier $AS_8$.

In another example, if a configuration file 615 has a binding association with a port 620 coupled to a particular access switch 610 and it is desirable to move that access switch 610 to a different port 620, a similar process of switching the network management module 650 between configurations can be used to maintain a binding association of the configuration file with that access switch. For example, as shown in table 655 in FIG. 10, configuration file $CF_3$ has a binding association with port identifier $P_{11}$ during the first time period, and as shown in FIG. 9, access switch 610 with identifier $AS_3$ is coupled to the port 620 with port identifier $P_{11}$. If it is desirable to move access switch 610 with identifier $AS_3$ to be coupled to a different port 620 of the switch fabric 602, the network management module 650 can be switched from its first configuration (i.e., the configuration file has binding association with a port) to its second configuration (i.e., the configuration file has binding association with an access switch) with respect to configuration file $CF_3$. This results in configuration file $CF_3$ having a binding association with identifier $AS_3$ of access switch 610. Access switch 610 with identifier $AS_3$ can then be moved and coupled to a different port 620 while maintaining its binding association with the configuration file $CF_3$.

The third configuration of the network management module 650, in which an identifier of an access switch has a binding association with an identifier of a port, provides that the particular pairing of an access switch to a port is maintained within the switch fabric 602. For example, access switch 610 with identifier $AS_4$ is to be coupled to port 620 with port identifier $P_8$ without other access switches being coupled to that port 610, and access switch 610 with identifier $AS_5$ is to be coupled to port 620 with port identifier $P_{23}$ without other access switched being coupled to that port 610. If a different access switch 610 (other than access switch 610 with identifier $AS_4$) is coupled to the port 620 with identifier $P_8$, an alert can be signaled to indicate that the wrong access switch 610 has been coupled to that port 610. Similarly, if a different access switch 610 (other than access switch 610 with identifier $AS_5$) is coupled to the port 620 with identifier $P_{23}$, an alert can be signaled to indicate that the wrong access switch 610 has been coupled to that port 610.

In some embodiments of a switch fabric, the ports are not identified by a physical location within the chassis (as with the switch fabric systems 500 and 600), but rather the ports are assigned globally-unique identifiers, and as the ports are moved within the switch fabric, the unique identifier moves with the port. In such an embodiment, a port of the switch fabric can be replaced or moved in a similar manner as described above for access switches by changing the binding associations of a configuration file between an access switch and a port as needed.

Figure 15:
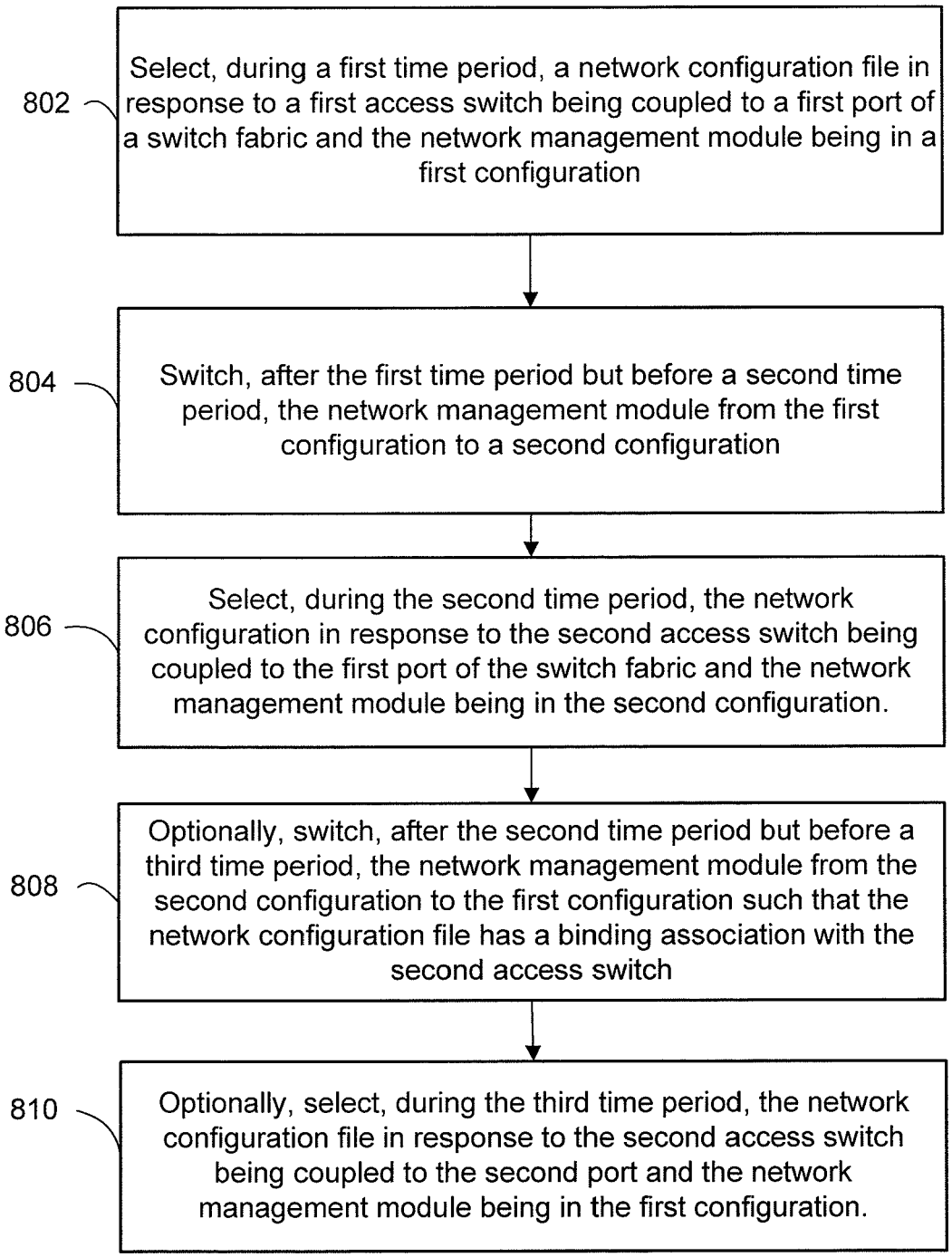
FIG. 15 is a flow chart illustrating a method of binding a configuration file within a switch fabric system according to an embodiment.

FIG. 15 is a flowchart illustrating a method of selecting a configuration file within a switch fabric system, according to an embodiment. At 802, during a first time period, a network configuration file can be selected in response to a first access switch being coupled to a first port of a switch fabric and a network management module being in a first configuration in which the network configuration file has a binding association with an identifier of the first access switch. At 804, after the first time period but before a second time period, the network management module can be switched from the first configuration to a second configuration in which the network configuration file has a binding association with an identifier of the first port of the switch fabric and not the identifier of the first access switch. At 806, during a second time period, the network configuration file can be selected in response to a second access switch being coupled to the first port of the switch fabric and the network management module being in a second configuration (e.g., the configuration file having a binding association with an access switch).

At 808, after the second time period but before a third time period, the network management module can optionally be switched from the second configuration to the first configuration such that the network configuration file has a binding association with an identifier of the second access switch that is operatively coupled to the first port. At 810, during the third time period, the network configuration file can be selected in response to the second access switch being coupled to the second port of the switch fabric and the network management module being in the first configuration.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, FIG. 14 discusses the network management module switching from a first configuration to a second configuration and from a second configuration to the first configuration, but it is also possible for the network management module to switch from a first configuration to a third configuration, from the third configuration to the first configuration, from the third configuration to the second configuration, and from the second configuration to the third configuration.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a network management module, implemented in at least one of hardware or a non-transitory processor-readable medium, configured to store a first network configuration file, the first network configuration file having a binding association with an identifier of a first port from a plurality of ports of a switch fabric when the network management module is in a first configuration, the network management module configured to select the first network configuration file based on the binding association with the identifier of the first port in response to a first access switch being operatively coupled to the first port, the first network configuration file having a binding association with an identifier of the first access switch when the network management module is in a second configuration, the network management module configured to uniquely identify the first access switch based on the identifier of the first access switch, the network management module configured to select the first network configuration file based on the binding association with the identifier of the first access switch in response to the first access switch being operatively coupled to the first port and a second port from the plurality of ports, the first port configured to be operatively coupled to the first access switch during a first time period, the first port configured to be operatively coupled to a second access switch during a second time period, the network management module configured to select the first network configuration file in response to the second access switch being operatively coupled to the first port when during the second time period the network management module is in the first configuration, the network management module configured to select a second network configuration file in response to the first port being operatively coupled to the second access switch when during the second time period the network management module is in the second configuration.

2. The apparatus of claim 1, wherein the network management module is configured to define a binding association between the identifier of the first port and the identifier of the first access switch when the network management module is in a third configuration such that the network management module provides an alert when the second access switch is operatively coupled to the first port.

3. The apparatus of claim 1, wherein the network management module is configured to define a binding association between an identifier of the first port and an identifier of the first access switch when the network management module is in a third configuration such that the network management module provides an alert when the first access switch is operatively coupled to the second port.

4. The apparatus of claim 1, wherein the first access switch is to be operatively coupled to the first port to define a first arrangement, the network management module configured to store the second network configuration file having a binding association with the second port when the network-management module is in the first configuration such that the network management module selects the second network configuration file in response to the first access switch being operatively coupled to the second port to define a second arrangement.

5. The apparatus of claim 1, wherein the first access switch is from a plurality of access switches, each access switch from the plurality of access switches is configured to be operatively coupled with the remaining access switches from the plurality of access switches by the switch fabric.

6. The apparatus of claim 1, wherein the first access switch is from a plurality of access switches, the first access switch from the plurality of access switches is configured to be operatively coupled to each remaining access switch from the plurality of access switches by the switch fabric defining part of a single logical hop between the first access switch from the plurality of access switches and the remaining access switches from the plurality of access switches.

7. The apparatus of claim 1, wherein the first network configuration file includes a network segment assignment.

8. The apparatus of claim 1, wherein the first network configuration file includes a network policy to be implemented at the first port.

9. The apparatus of claim 1, wherein the network management module is configured to store the second network configuration file, the second network configuration file having a binding association with an identifier of the second access switch when the network management module is in the second configuration.

10. A non-transitory processor-readable medium storing code representing instructions to cause a processor to:

select, during a first time period, a first network configuration file in response to a first access switch being coupled to a first port of a switch fabric and a network management module being in a first configuration in which the first network configuration file has a binding association with an identifier of the first port of the switch fabric;

switch, after the first time period but before a second time period, the network management module from the first configuration to a second configuration, the first network configuration file has a binding association with an identifier of the first access switch and not the identifier of the first port of the switch fabric when the network management module is in the second configuration;

select, during the second time period, the first network configuration file in response to the first access switch being coupled to a second port of the switch fabric and the network management module being in the second configuration, the first port configured to be operatively coupled to the first access switch during a third time period, the first port configured to be operatively coupled to a second access switch during a fourth time period;

select the first network configuration file in response to the second access switch being operatively coupled to the first port when during the fourth time period the network management module is in the first configuration; and select a second network configuration file in response to the first port being operatively coupled to the second access switch when during the fourth time period the network management module is in the second configuration.

11. The non-transitory processor-readable medium of claim 10, the code further comprising code representing instructions to cause the processor to:

switch, after the second time period but before a fifth time period, the network management module from the second configuration to the first configuration such that the first network configuration file has a binding association with an identifier of the second port; and select, during the fifth time period, the first network configuration file in response to the second access switch being coupled to the second port and the network management module being in the first configuration.

12. The non-transitory processor-readable medium of claim 10, wherein the first network configuration file includes a network segment assignment.

13. The non-transitory processor-readable medium of claim 10, wherein the first network configuration file includes a network policy to be implemented by at least one of the first port of the switch fabric or the second port of the switch fabric.

14. The non-transitory processor-readable medium of claim 10, wherein the network management module is configured to uniquely identify the first access switch based on the identifier of the first access switch.

15. A system, comprising:
- a plurality of access switches, each access switch from the plurality of access switches configured to be operatively coupled to a port from a plurality of ports of a switch fabric, each access switch from the plurality of access switches having an identifier that uniquely identifies that access switch within a network including the plurality of access switches, the identifier of each access switch from the plurality of access switches having a binding association with a network configuration file from a plurality of network configuration files when the plurality of access switches is in a first configuration such that each access switch from the plurality of access switches is associated with one network configuration file from the plurality of network configuration files independent of which port from the plurality of ports each access switch from the plurality of access switches is to be operatively coupled,
- a first access switch from the plurality of access switches configured to be assigned a first network configuration file from the plurality of network configuration files when the first access switch is in a second configuration and based on a port from the plurality of ports to which the first access switch is to be operatively coupled,
- the first access switch configured to be assigned a second network configuration file from the plurality of network configuration files when the first access switch is in a third configuration such that an identifier of the first access switch has a binding association with the second network configuration file independent of which port from the plurality of ports the first access switch is to be operatively coupled
- the first access switch configured to be operatively coupled to a first port from the plurality of ports during a first time period, a second access switch from the plurality of access switches configured to be operatively coupled to the first port during a second time period,
- the second access switch configured to be assigned the first network configuration file in response to the second access switch being operatively coupled to the first port from the plurality of ports when during the second time period the second access switch is in a first configuration,
- the second access switch configured to be assigned the second network configuration file in response to the second access switch being operatively coupled to the first port when during the second time period the second access switch is in a second configuration.

16. The system of claim 15, wherein each access switch from the plurality of access switches is to be operatively coupled with the remaining access switches from the plurality of access switches by the switch fabric.

17. The system of claim 15, wherein the first access switch from the plurality of access switches is configured to be operatively coupled to each remaining access switch from the plurality of access switches by the switch fabric defining part of a single logical hop between the first access switch from the plurality of access switches and each remaining access switch from the plurality of access switches.

18. The system of claim 15, wherein each network configuration file from the plurality of network configuration files includes a network segment assignment.

19. The system of claim 15, wherein each network configuration file from the plurality of network configuration files includes a network policy to be implemented at a port from the plurality of ports.

20. The system of claim 15, wherein an identifier of each access switch from the plurality of access switches has a binding association with an identifier of a port from the plurality of ports when the plurality of access switches is in a fourth configuration such that an access switch from the plurality of access switches provides an alert when that access switch from the plurality of access switches is operatively coupled to a port from the plurality of ports having an identifier that does not have a binding association with that access switch.

* * * * *